March 2, 1954 W. T. EPPLER 2,670,543
TESTING UNIT FOR CABLES
Filed July 1, 1950 7 Sheets-Sheet 1

INVENTOR
W.T. EPPLER
BY
ATTORNEY

March 2, 1954 W. T. EPPLER 2,670,543
TESTING UNIT FOR CABLES
Filed July 1, 1950 7 Sheets-Sheet 2
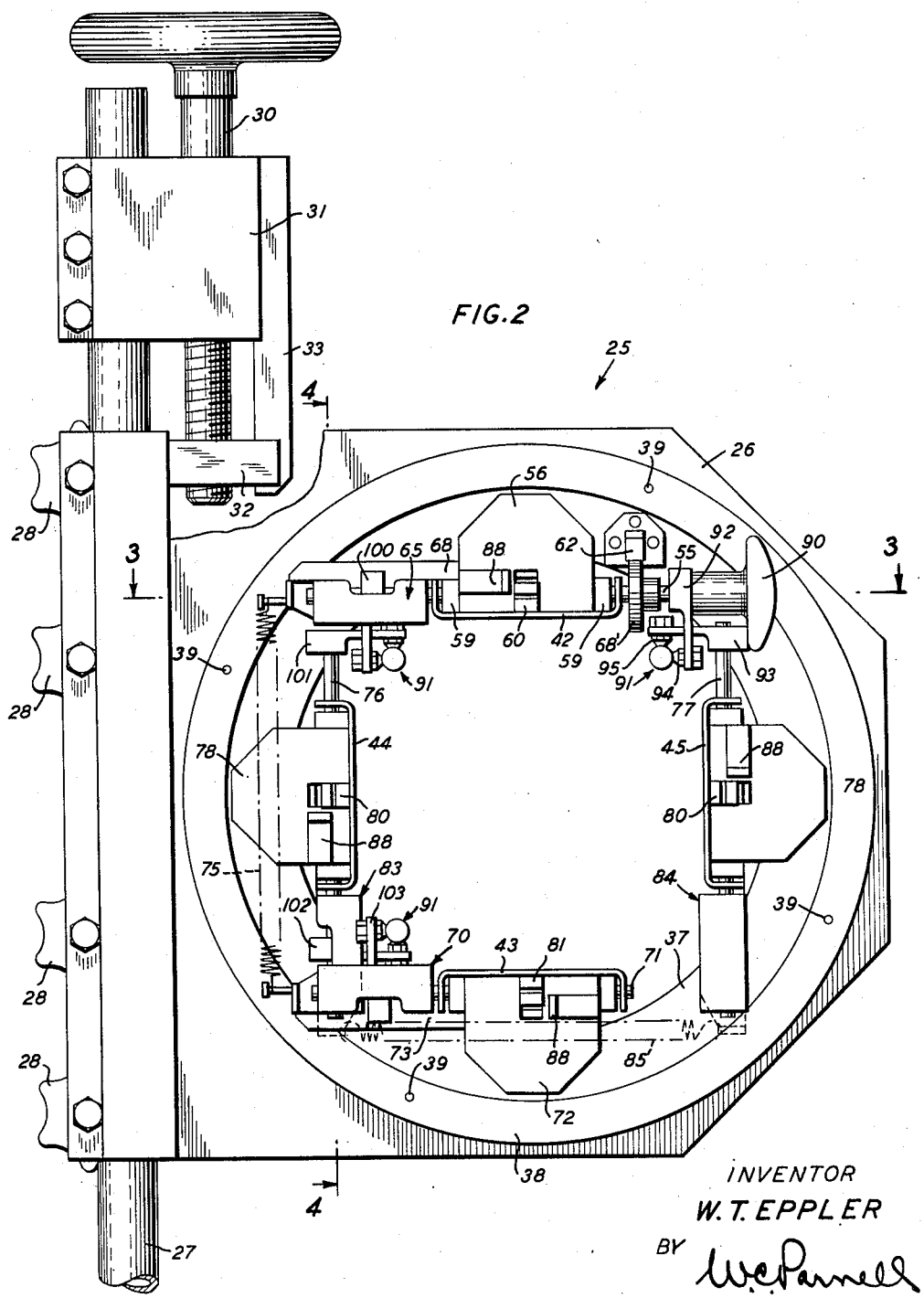

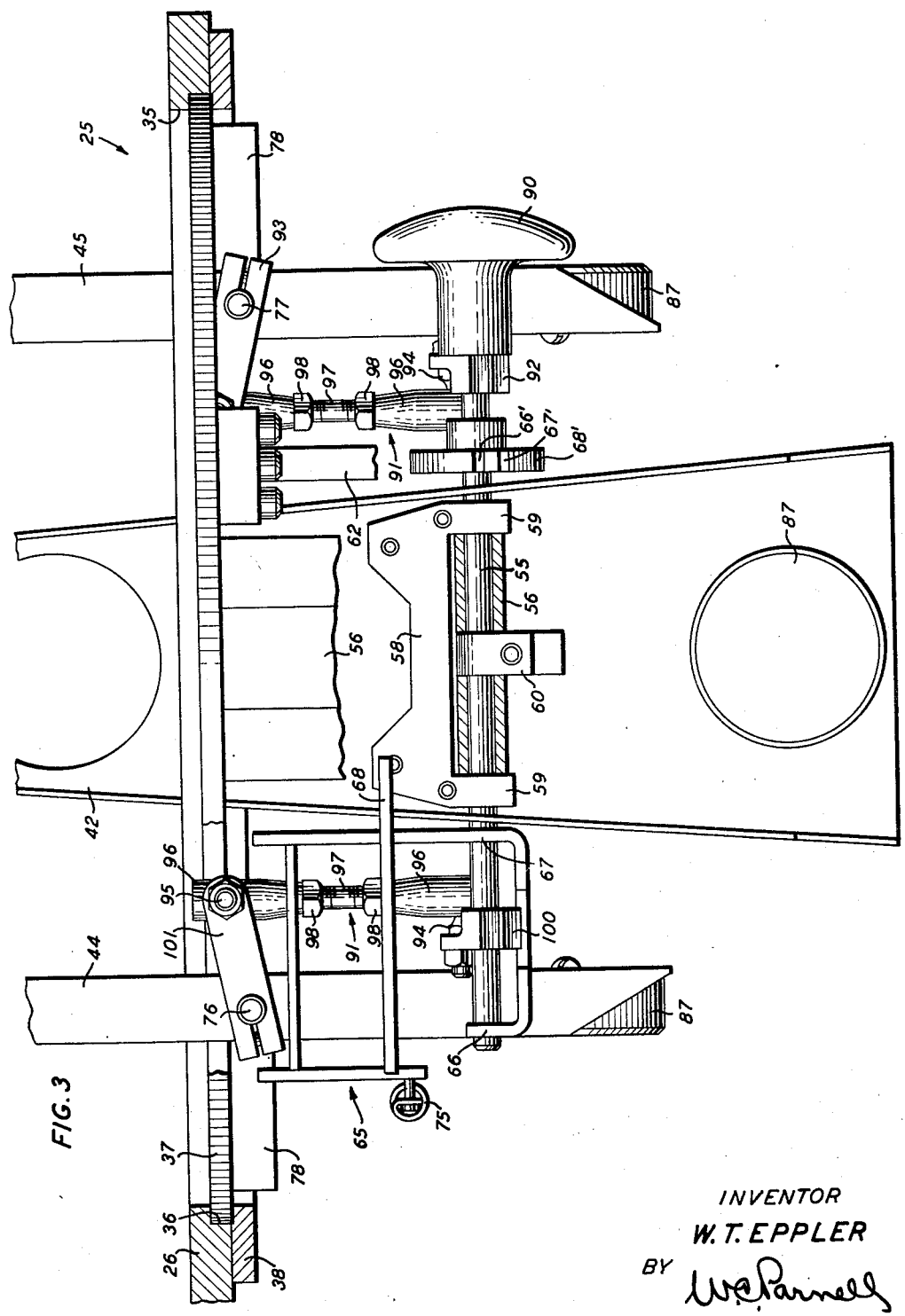

March 2, 1954  W. T. EPPLER  2,670,543
TESTING UNIT FOR CABLES
Filed July 1, 1950  7 Sheets-Sheet 4
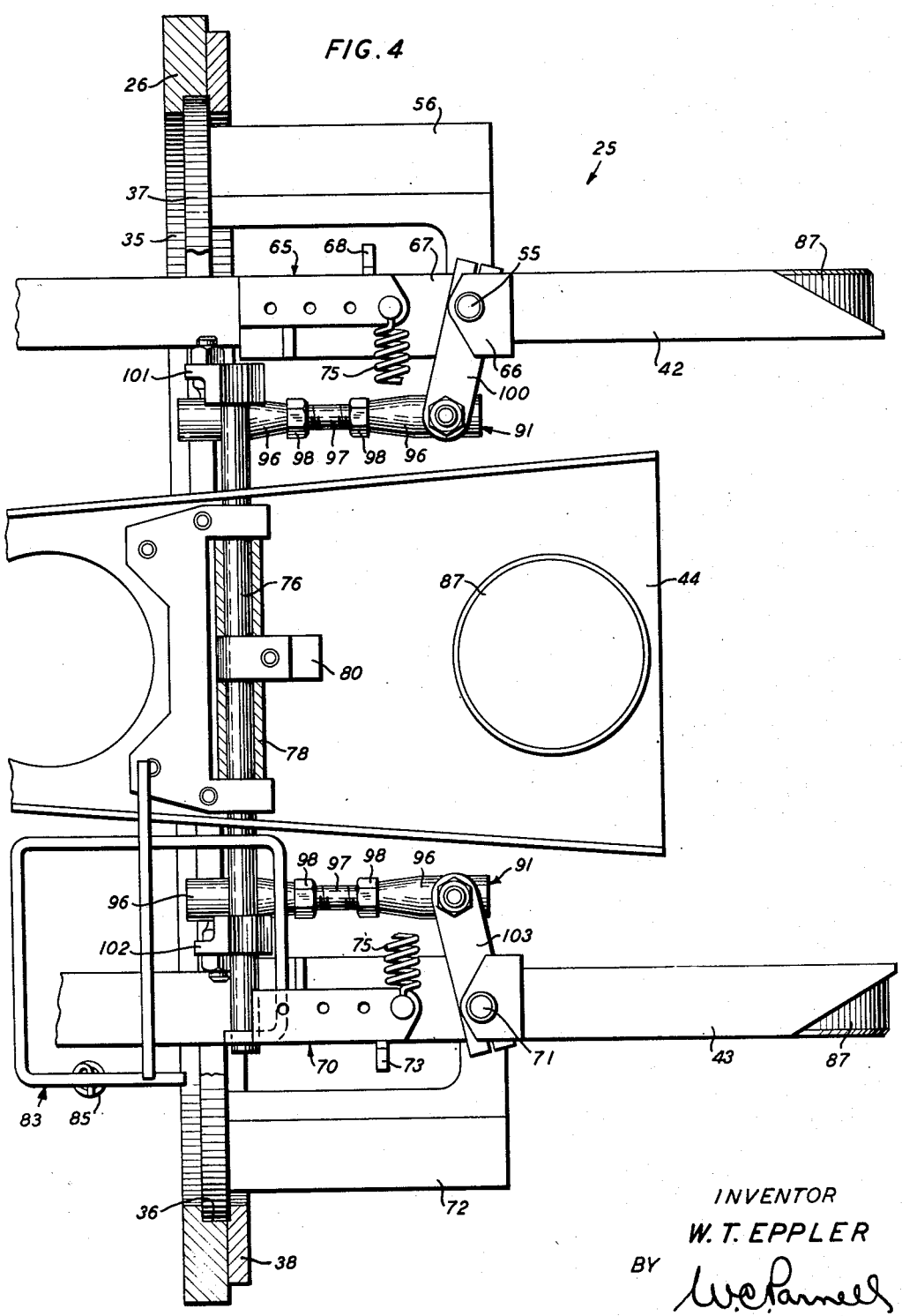
INVENTOR
W. T. EPPLER
BY
*W. C. Parnell*
ATTORNEY March 2, 1954  W. T. EPPLER  2,670,543
TESTING UNIT FOR CABLES
Filed July 1, 1950  7 Sheets-Sheet 5
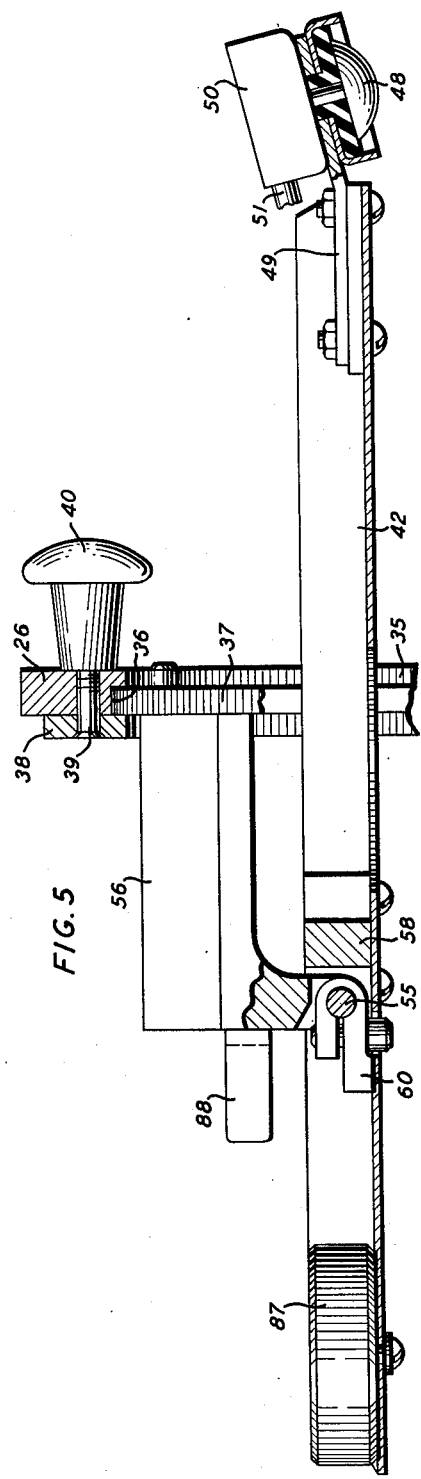
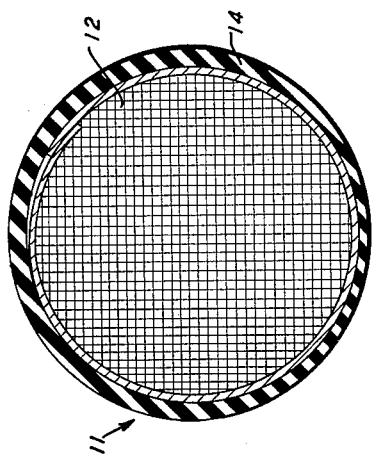
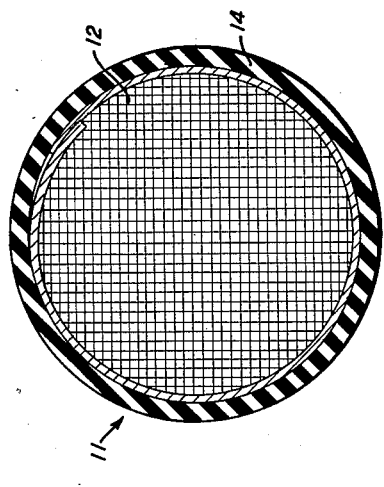
INVENTOR
W. T. EPPLER
BY
W. C. Parnell
ATTORNEY March 2, 1954 W. T. EPPLER 2,670,543
TESTING UNIT FOR CABLES
Filed July 1, 1950 7 Sheets-Sheet 6

INVENTOR
W. T. EPPLER
BY
ATTORNEY

March 2, 1954 W. T. EPPLER 2,670,543
TESTING UNIT FOR CABLES
Filed July 1, 1950 7 Sheets-Sheet 7

INVENTOR
W. T. EPPLER
BY
*W. C. Parnell*
ATTORNEY

Patented Mar. 2, 1954

2,670,543

UNITED STATES PATENT OFFICE 2,670,543

TESTING UNIT FOR CABLES

Walter T. Eppler, Cranford, N. J., assignor to Western Electric Company, Incorporated, New York, N. Y., a corporation of New York Application July 1, 1950, Serial No. 171,675

2 Claims. (Cl. 33—174)

This invention relates to apparatus for use in testing cable sheaths, particularly to determine any variations in the thicknesses of sheaths extruded on electrical cables.

In the manufacture of certain types of cables for use in the telephone industry, a plastic sheath is extruded over the cable core, and an existing problem is to assure extrusion of the material uniformly about the core. It is not possible to determine the uniformity of the sheath merely by observation of the extrusion process. Furthermore, the plastic sheath, if applied uniformly to the core will give the required protection for the core of the cable, but if this material is unusually thin at certain portions, the sheath is greatly weakened.

It is the object of the present invention to provide an apparatus which is simple in structure, but highly efficient whereby the sheath on the core, advancing from the extrusion machine, may be tested to determine thicknesses of the sheath at spaced positions about its cross-sectional area.

With this and other objects in view, the invention comprises an apparatus for use in testing a sheath of a cable advancing longitudinally in a given path, the apparatus including arms, mounted for rocking movement at spaced positions about the cable, supporting the electrical contact members at their adjacent ends to be urged under uniform pressure into engagement with spaced portions of the sheath so that when employed in conjunction with a test set, any variations in the thickness of the sheath may be determined.

More specifically, the arms operate in pairs, the opposing arms in each pair being connected together by springs whose forces are to provide the uniform pressure for the contacts against the diametrically spaced surfaces of the cable sheath. To allow the springs to function in this manner, the arms are counterbalanced by the aid of weights mounted on the ends thereof opposite those ends supporting the contacts so that only the forces derived from the springs will be applied through the contacts to the sheath. The arms are supported freely on shafts which are connected operatively in such a manner that through the rocking movement of one shaft a like movement will be imparted to the other shafts. Furthermore, although the arms are free to move in a rocking motion on their respective shafts, these shafts have pawls fixed thereto to move the arms into open position, for example, during the initial forwarding of the cable or during inspection of the cable, the arms being held in their open position by a latch.

Other objects and advantages will be apparent from the following detailed description when considered in conjunction with the accompanying drawings, wherein:

Fig. 2 is a rear elevational view of the main portion of the apparatus including the connecting mechanism for the shafts as well as the other structures, but eliminating the counterbalancing weights so that some of the former structures may be shown;

Fig. 3 is an enlarged horizontal sectional view taken along the line 3—3 of Fig. 2;

Fig. 4 is an enlarged fragmentary vertical sectional view taken along the line 4—4 of Fig. 2;

Fig. 5 is an enlarged detailed view of one of the arms illustrating the manner in which it is supported;

Fig. 9 is a cross-sectional view of a cable having the sheath uniformly extruded thereon; and Fig. 10 is a cross-sectional view of the cable illustrating a more undesirable formation of the sheath on the cable.

Figure 1:
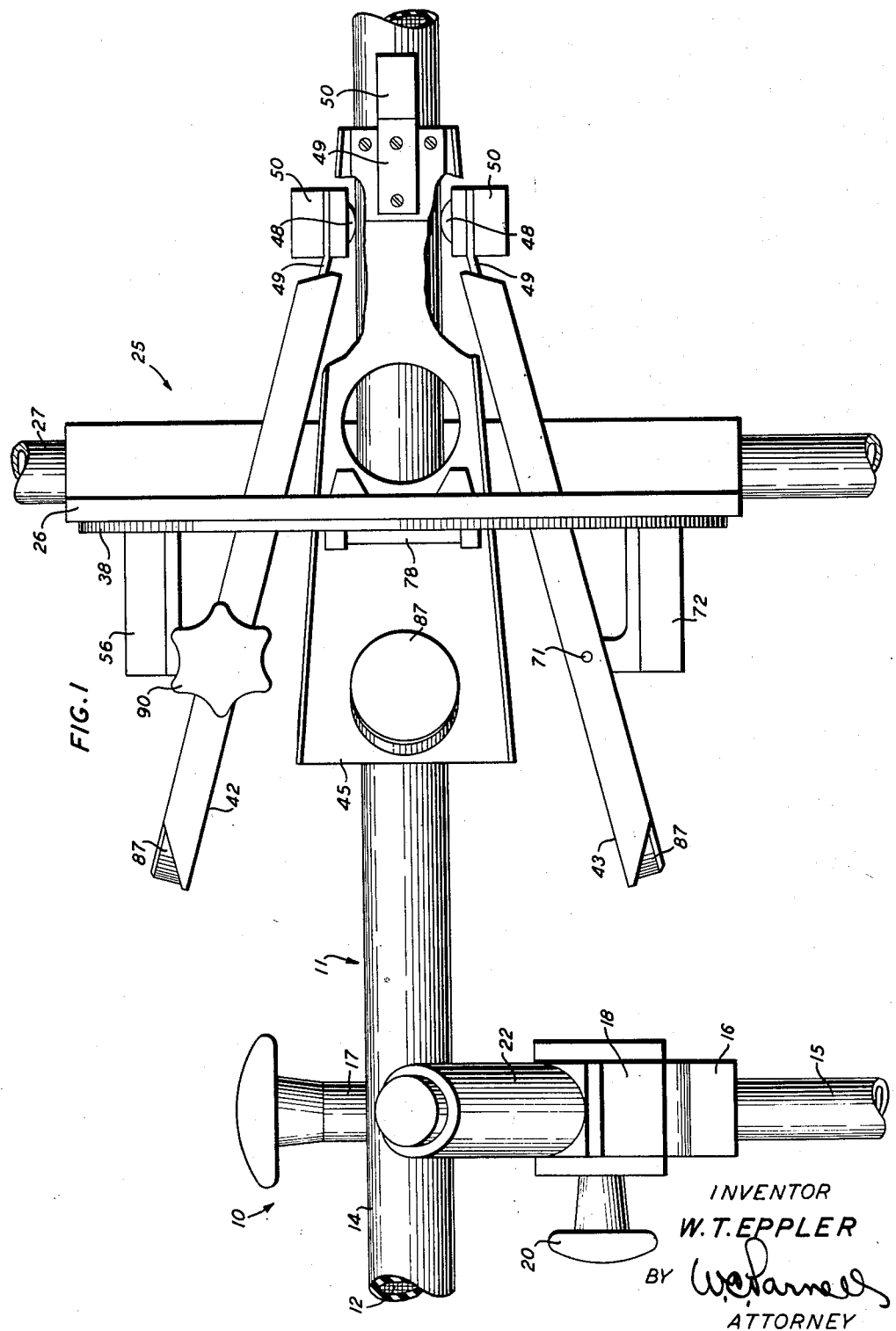
Fig. 1 is a side elevational view of the apparatus shown in its testing position relative to a cable, most of the operating mechanism for the arms not being shown in this figure.

Referring now to the drawings, attention is first directed to Fig. 1 which illustrates a unit 10 to guide a cable 11, having a core 12 and a sheath 14, in a given path. The unit 10 is mounted on a vertical member 15 supported by a base (not shown) and having a bracket 16 mounted near its upper end. The bracket 16 is bifurcated at its inner end with aligned apertures therein for an adjusting screw 17 which supports an arm 18. Rotation of the screw 17 will adjust the arm 18 vertically to any desired position where it may be locked by suitable conventional means through the rotation of a hand wheel 20. The arm 18 supports rollers 22 in a V-shaped formation so that cables of various cross-sectional contours or sizes may be supported and guided in their given paths. The centerlines of the cables may be maintained with respect to a testing unit 25 through the adjustment of the screw 17.

The unit 25 includes a bracket-like support 26, disposed on a vertical member 27 which may be mounted on the base with the vertical member 15. Suitable clamping means 28 normally secure the support 26 rigidly on the vertical member 27, but may be loosened for adjustment of the support relative to the centerline of the cable through the rotation of an adjusting screw 30. The adjusting screw 30 is rotatable in a fixed bracket 31 and threadedly connected to a projection 32 of the support. The outer end of the projection 32 is bifurcated to straddle a vertical member 33 mounted upon or integral with the fixed bracket 31 to allow vertical adjustment of the support 26 but to prevent lateral or swinging movement thereof relative to the vertical member 27.

The support 26 has a circular opening 35 therein and a concentric annular recess 36 to receive a mounting ring 37. An annular retaining element or clamp 38 is supported by spaced screws 39 in apertures of the support 26 upon which thumb nuts 40 are mounted. The thickness of the mounting ring 37 is greater than the depth of the recess 36 whereby tightening of the nuts 40 on their screws 39 will cause the clamping element 38 to hold the mounting ring 37 against movement.

In the unit 25 there are two pairs of arms 42—43 and 44—45. These arms are substantially identical in structure, they being formed of a light metal, preferably aluminum, with longitudinally bent up sides for strength and suitable apertures or cutaway portions to minimize weight. The arms have like contacts 48 supported at desired angles and insulated from their individual brackets 49 as illustrated in Fig. 5. These brackets also support housings 50 for the conventional electrical connections with the contacts through conductors 51 of a test set (not shown).

As previously stated, the arms work in pairs and to avoid interference of one pair with another and to facilitate in the operative connection of these arms with each other, the pairs of arms are mounted in staggered relation as illustrated in Fig. 1.

Figure 7:
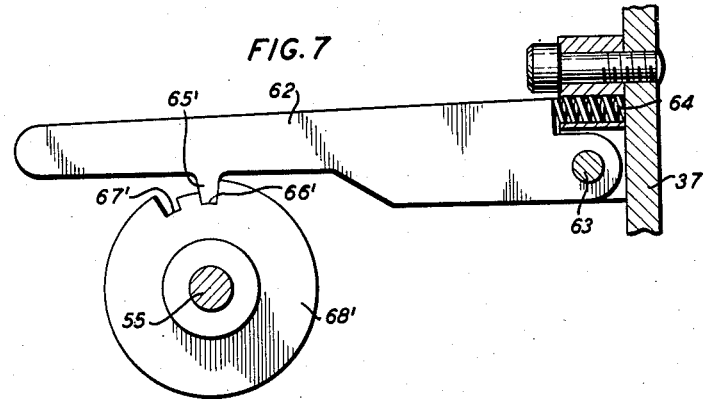
Fig. 7 is a side elevational view of the latching mechanism.
Figure 8:
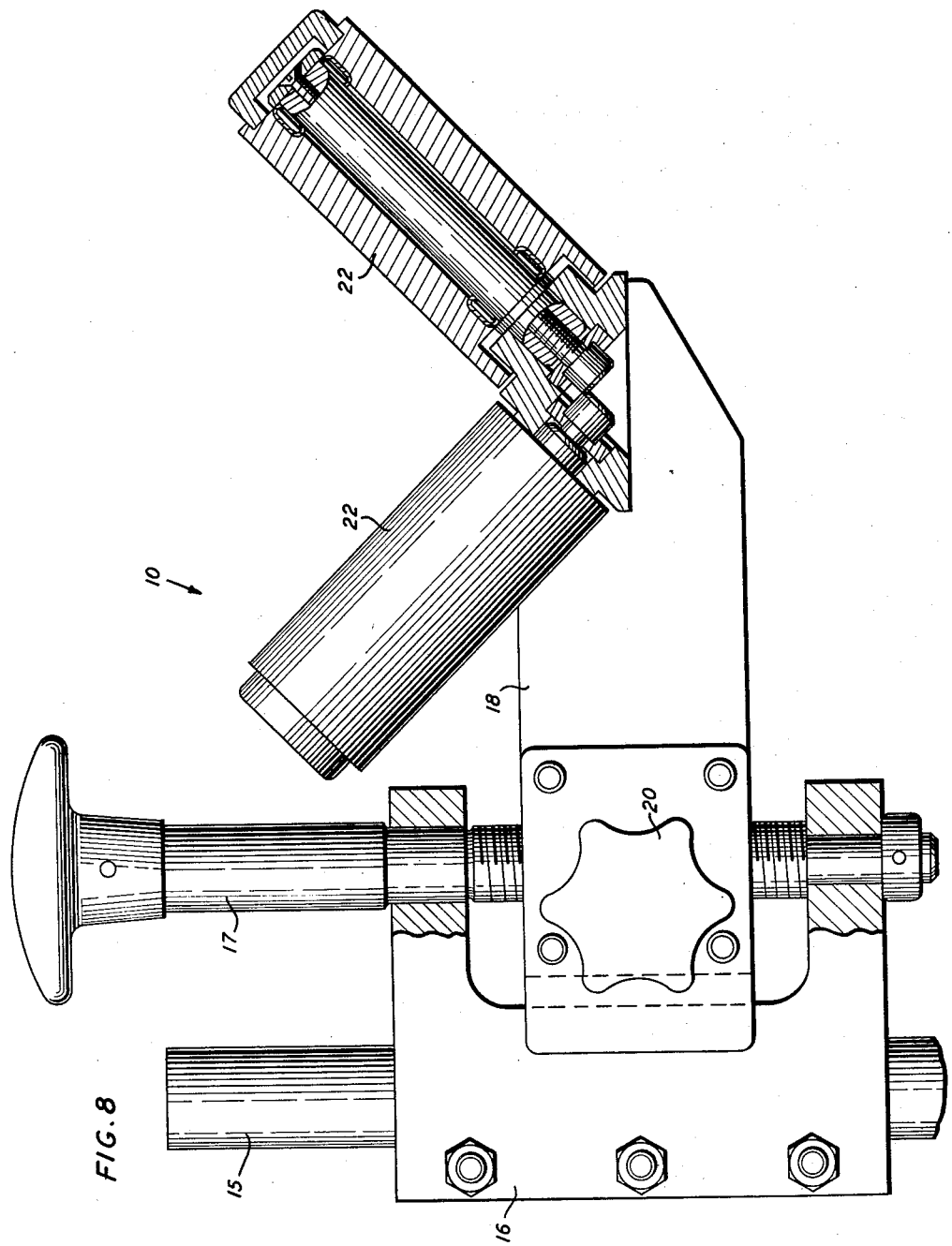
Fig. 8 is an enlarged fragmentary detailed view of the cable guiding unit.

A main shaft 55 (Fig. 3) is supported by a bracket 56 which is fixedly mounted on the mounting ring 37 (Fig. 4). The arms 42 have a bracket 58 mounted thereon (Fig. 3) with bearing members 59 for the shaft 55, thus supporting the arm 42 for rocking movement on the shaft. A pawl 60 is firmly mounted on the central portion of the shaft 55 in a recessed portion of the bracket 56 to move with the shaft to function as a means to move the arm 42 into its open position. A latch 62 (Figs. 3 and 7) pivotally supported at 63 on the mounting ring 37 is normally urged counterclockwise by a spring 64 and carries a tooth-like portion 65' receivable selectively in notches 66' and 67' of a disc 68' mounted on the main shaft 55. When the latch is in the position shown in Fig. 7, with the tooth 65' entering the recess 66', the arm 42 will be in its open position and as will hereinafter be described, all of the arms 42—43 and 44—45 will be in their open positions. When the tooth 65' of the latch 62 is in the recess 67' the arms will be free to cause their contacts 48 to ride upon the periphery of the cable sheath.

A frame-like element 65 has apertured portions 66 and 67 through which the main shaft 55 extends whereby the element, although supported by the main shaft, is free to rotate thereon. A projection 68 of the element extends over the arm 42 to engage the arm between the shaft 55 and its contact 48. A substantially identical frame-like element 70 is provided for the arm 43 which is supported by a shaft 71 disposed parallel with the main shaft 55. A bracket 72 identical with the bracket 56 and fixed to the mounting ring 37 supports the shaft 71, the shaft 71 in turn supporting the frame-like element 70.

A projection 73 (Fig. 4) of the element 70 extends beneath the arm 43 to engage the arm between its shaft 71 and contact 48, so that a force embodied in a spring 75 connecting the two elements 65 and 70 will be applied to the arms 42 and 43 and through these arms to their respective contacts 48.

Figure 6:
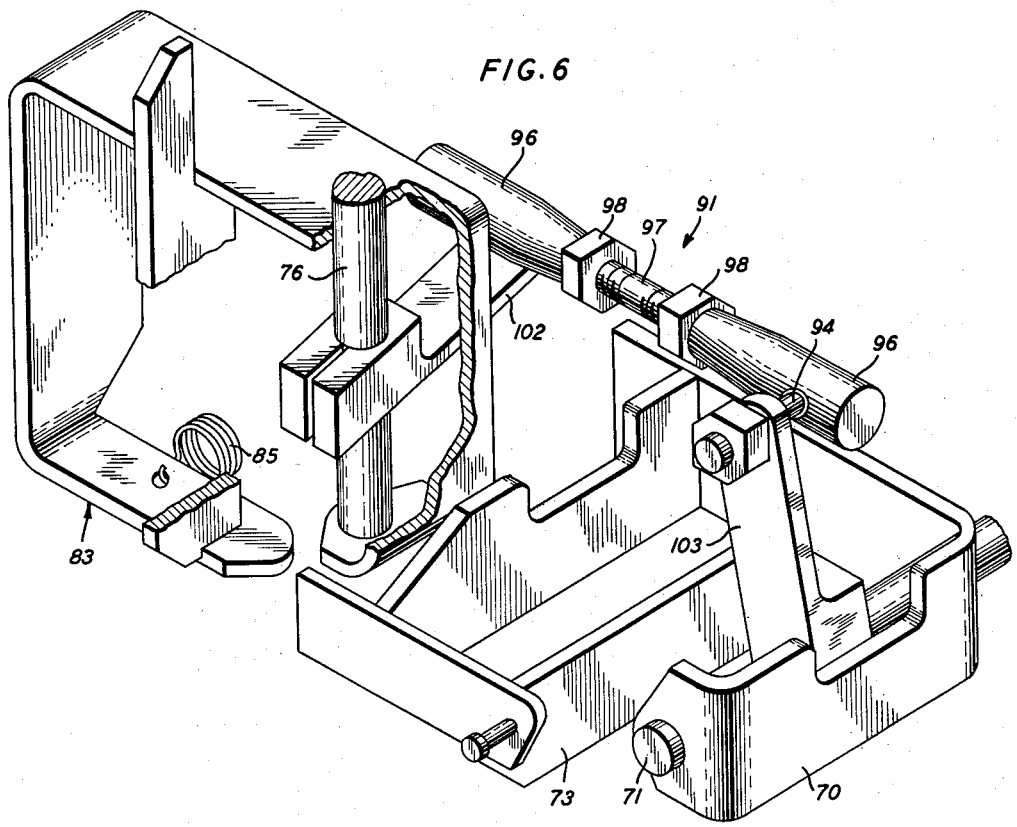
Fig. 6 is an isometric view illustrating certain of the details of the operating mechanism.

The arms 44 and 45 are supported in substantially the same manner as the arms 42 and 43 and provided with the same mechanism, the major difference being in their positions with respect to the arms 42 and 43. This difference is evidenced by viewing Figs. 1 and 4, where the shafts 76 and 77 (Fig. 2) are mounted closely adjacent the mounting ring 37, the thickness of their supporting brackets 78 being shown in Fig. 3 for comparison with the supporting brackets 56 and 72 for the shafts of the arms 42 and 43. The shafts 71, 76 and 77 are supported near their centers by their brackets 72 and 78, these brackets being bifurcated or centrally recessed to receive pawls 80 for the shafts 76 and 77 and 81 for the shaft 71 so that rocking movement of their respective shafts may cause movement of their arms into the open positions or to free the arms for movement into their closed positions. Frame-like elements 83 and 84 (Figs. 2 and 6) for the shafts 76 and 77, which are substantially identical to the elements 65 and 70, are supported for rocking movements on their shafts with their projections in engagement with their arms 44 and 45 and under the control of a connecting spring 85.

The arms 42, 43, 44 and 45 are free to rock on their respective shafts when released by the latch 62 and in order that the forces of the springs 75 and 85 may be utilized to hold the contacts 48 under given uniform pressure against the cable sheath, the arms are counterbalanced by weights 87 mounted on the ends of the arms opposite the contacts. Furthermore, outwardly projecting stops 88 are rigidly mounted on the brackets 56, 72 and 78 to be engaged by their respective arms during the absence of a cable between the contacts to prevent engagement of the contacts with each other.

The actuating means for the arms, utilized mainly to move the arms into their open positions with the contacts away from the cable, originates with a hand wheel 90 rigidly mounted upon one end of the main shaft 55 whereby the main shaft may be rocked in either direction. The main shaft 55 is operatively connected near its ends to the parallel shafts 76 and 77 for the arms 44 and 45 by connecting units 91 (Fig. 2) while a similar connecting unit 91 connects the lower end of the shaft 76 operatively to the shaft 71. These connecting units have been given the same reference numeral as they are identical in structure and a detailed description of one will apply to all of them. Attention is first directed to the connecting unit 91 adjacent the hand wheel 90 which operatively connects the outer ends of levers 92 and 93 which are fixedly mounted upon their respective shafts 55 and 77. Here the unit 91 includes members 94 and 95 fixedly mounted on the ends of their respective levers and having ball-like portions (not shown) on their outer ends. The ball-like portions are housed in sockets 96 connected to each other by a threaded element 97 which may be adjusted relative to each other and locked in adjusted position by lock nuts 98. Each unit 91 through the aid of the members 94 and the connected sockets 96 provides a swivel type of linkage between the levers of their respective shafts, namely, the levers 92 and 93' connecting shafts 55 and 77, the levers 100 and 101, connecting the main shaft 55 and the shaft 76 and the levers 102 and 103 connecting the shaft 76 with the shaft 77. Furthermore, the adjustability of the units embodied in the threaded elements 97 enables the operator to adjust the relative positions of the arms, particularly when in the open position and to assure their actuation during rocking movement of the hand wheel 90.

Considering now the operation of the apparatus, let it be assumed that the unit 10 is adjusted for the proper position of the rollers 22 for the particular cable to be tested. It is also assumed that the necessary adjustments have been made in the location of the unit 25 relative to the centerline of the cable. Although this apparatus was designed for use in conjunction with an electrical test set, no test set is shown, since the novel features of the apparatus are not dependent on the type of test set used, but are embodied in a series of spaced electrical contacts supported by counterbalanced arms which may be moved readily out of gaging position and when in gaging position will be forced by uniform pressures into engagement with the sheath on the cable core. The contacts 48 in their electrical test circuits function in pairs, that is, the contact 48 of the arm 42 is arranged to function with the contact of the arm 43, and in the same manner, the contacts of the arms 44 and 45 are so arranged.

It will be apparent that when the arms are released for movement into their testing positions, the springs 75 and 85 will function to contribute their forces to their respective pairs of arms and contacts. If the sheath is formed uniformly on the core as illustrated in Fig. 9, the various contacts 48 are held at like positions from the centerline of the unit 25, which is coincident with the centerline of the cable. If only one contact should ride upon the sheath, it may be possible for that contact to be positioned so that it would not be effective in registering any variation in the thickness of the sheath although such variations may exist, as illustrated in Fig. 10. However, by employing a plurality of equally spaced contacts on similarly arranged arms or pairs of arms and allowing these contacts to function in pairs, for example, one balanced against the other, any variation in the formation of the sheath on the core would be detected. This is apparent by viewing Fig. 10. The side contacts, namely, those of the arms 44 and 45 would not register any noticeable variation from this illustration as the thickness of the sheath engaged by them is substantially equal at both sides of the cable. However, the wide variation in thickness of the sheath at the top and bottom thereof would be detected by the top and bottom contacts of the arms 42 and 43, the sheath being much thicker at the top of the cable than at the bottom.

When it is desirable to move the arms into the open position, the operator need only rock the hand lever 90, thus rocking the shaft 55, when released by the latch 62, to allow the latch or the tongue portion 65' thereof to drop into the recess 67'. When the shaft 55 is rocked, the levers 92 and 100 will be moved like distances and through their connecting units 91, the same rocking motions will be imparted through the levers 93 and 101 to the shafts 77 and 76 respectively. The rocking motion imparted to the shaft 76 will cause its lever 102, through the connecting unit 91, to rock the lever 103, rocking the shaft 71 the same distance that was imparted to the other shafts. In this manner, the operator imparts a rocking motion to the main shaft and through the connecting units 91, like rocking motions are imparted to the other shafts against the forces of their springs 75 and 85. The pawls 60, 80 and 81 on their respective shafts will engage their respective arms to move them into their open or outer positions where they will remain until it is desirable to return the contacts into engagement with the cable. At this time, the operator need only release the latch to allow the springs 75 and 85 to return the arms with their contacts to their testing positions. It is preferred, however, that the operator control this return movement by gripping the hand wheel 90 to retard movement of the contacts into engagement with the sheath allowing them to reach their respective positions at a slower speed. The function of the latch 62—65 in the recess 66' is to remove any interference of the arm actuating means with the arms so that the counterbalanced arms will be under the sole control of their springs 75—85. For example, the pawls 60, 80 and 81 of the actuating mechanism are held beyond possible contact with the arms during testing of the cable sheath. It will be apparent also that the mounting ring 37 with the mechanism supported thereby may be moved about its center to locate the contacts 48 at varied positions about the sheathed core.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for use in testing a sheath of a cable advancing longitudinally in a given path, the apparatus comprising shafts rotatably supported at circumferentially spaced positions about the path, means operatively conecting the shafts to cause them to rock like distances simultaneously, arms mounted for free rocking movement on their respective shafts into closed positions, testing elements carried by the arms for engagement with the sheath at spaced positions about its periphery when the arms are in their closed positions, means to rock one of the shafts to cause them to rock simultaneously, projections fixed to the shafts to engage their arms during rocking of the shafts to move them with the testing elements into open positions away from the sheath, a member fixedly mounted on one of the shafts, and a latch adapted to engage the member to thereby hold the shafts in positions with the projections out of engagement with the arms.

2. An apparatus for use in testing a sheath of a cable advancing longitudinally in a given path, the apparatus comprising shafts rotatably supported at circumferentially spaced positions about the path, means operatively connecting the shafts to cause them to rock like distances simultaneously, arms mounted for free rocking movement on their respective shafts into closed positions, testing elements carried by the arms for engagement with the sheath at spaced positions about its periphery when the arms are in their closed positions, means to rock one of the shafts to cause them to rock simultaneously, projections fixed to the shafts to engage their arms during rocking of the shafts to move them with the testing elements into open positions away from the sheath, a member having two latch receiving portions fixedly mounted on one of the shafts, and a latch actuable into engagement with one of the portions to hold the arms and testing elements in their open positions and into engagement with the other portion to hold the shafts in closed positions with the projections out of engagement with the arms.

WALTER T. EPPLER.

References Cited in the file of this patent

UNITED STATES PATENTS

| Number | Name | Date |
|---|---|---|
| 824,064 | Callan | June 19, 1906 |
| 1,133,300 | McGauley | Mar. 30, 1915 |
| 1,671,737 | Norton | May 29, 1928 |
| 1,914,013 | Gaisman | June 13, 1933 |
| 1,936,828 | Clement et al. | Nov. 28, 1933 |
| 2,085,264 | Lyon | June 29, 1937 |
| 2,260,354 | Wallace | Oct. 28, 1941 |
| 2,303,858 | Ostberg | Dec. 1, 1942 |
| 2,308,033 | Terry et al. | Jan. 12, 1943 |
| 2,327,629 | Fedorchak | Aug. 24, 1943 |
| 2,413,363 | Beezley | Nov. 25, 1947 |
| 2,515,787 | Moe | July 18, 1950 |
| 2,519,221 | Bogen et al. | Aug. 15, 1950 |

FOREIGN PATENTS

| Number | Country | Date |
|---|---|---|
| 33,162 | Sweden | July 10, 1912 |
| 451,607 | Great Britain | Aug. 10, 1936 |